3,280,239
ELASTIC MELT EXTRUDER AND METHOD
OF EXTRUSION
Lawrence D. Ninneman, Toledo, Ohio, assignor to Owens-Illinois Glass Company, a corporation of Ohio
Filed Mar. 6, 1963, Ser. No. 263,232
8 Claims. (Cl. 264—176)

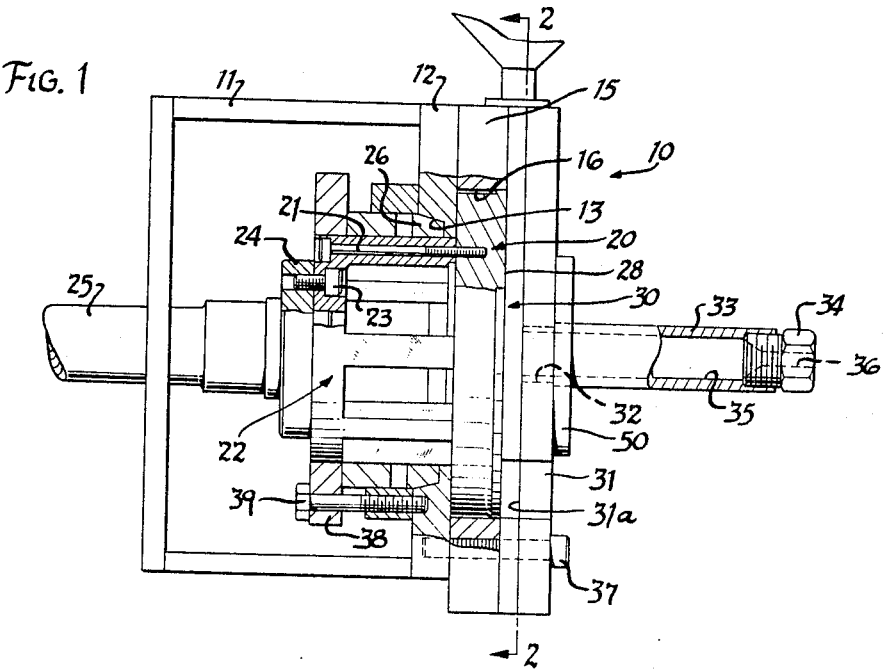
Oct. 18, 1966     L. D. NINNEMAN     3,280,239
ELASTIC MELT EXTRUDER AND METHOD OF EXTRUSION
Filed March 6, 1963
INVENTOR.
LAWRENCE D. NINNEMAN
BY W. A. Schaich
Spencer L. Blaylock Jr.
ATTORNEYS United States Patent Office 3,280,239
Patented Oct. 18, 1966

The present invention relates to an elastic melt extruder and to a method of extrusion and, more particularly, to a method of extrusion and an elastic melt extruder wherein material is fed to and maintained within a shearing gap provided by a gap plate inserted between relatively rotatable shearing elements.

There has been recently developed a new type of plasticizer-extruder, commonly known as an "elastic melt extruder" utilizing "the normal force effect," i.e. the normal force developed when a visco-elastic material is sheared between a rotating plate and a stationary plate, to perform the functions of a conventional plasticizer-extruder. Such an elastic melt extruder is described in detail in "Modern Plastics Magazine" of October, 1959, at page 107, in an article by Bryce Maxwell and Anthony J. Scalora.

Such an elastic melt extruder utilizes a power-driven, rotatable disc operable within a chamber and solid plastic material is furnished from a supply hopper or the like to a peripheral cylindrical or conical surface of the disc. The radial face of the disc is spaced through a narrow gap from the corresponding face of a front plate having an exit orifice axially aligned with the disc. As the disc is rotated, the thermoplastic material confined between the radial shearing faces of the disc and the orifice plate is subjected to shearing forces. The thermoplastic material is essentially elastic and the tendency of the sheared material for elastic recovery after arcuate shearing and stretching between the radial faces effects centripetal flow of material between the disc and the orifice plate and toward the central orifice, the material issuing from the orifice in plasticized condition at a predetermined pressure.

In conventional centripetal or "elastic melt" extruders of the type above described, and as disclosed in U.S. Patent 3,046,603 to Maxwell, a rotating plate (forming the shear rotor) merely projects into a space into which solid plasticized material is fed. As a result, plasticized or partially plasticized material builds up on the shoulders of the rotating plate to at least partially block the material feed inlet. Additionally, the shear rotor is generally merely supported in spaced relation to the shear stator to define the shearing gap therebetween. As a result, plastic material in the gap is not properly directed toward the extrusion orifice which is centrally located in the shearing stator element and that portion of the gap to which fresh material is fed is not kept free of previously introduced, partially plasticized material.

The present invention provides an improved elastic melt extruder of simple, but efficient design wherein a gap plate is interposed between the shear rotor and the shear stator elements, the gap plate being apertured so that the plate circumscribes the shearing chamber intermediate the rotor and stator elements. The shearing chamber is spiroidal in configuration and is circumscribed by the gap plate portions enclosing the aperture therein, these gap plate portions, i.e. the walls of the shearing chamber being of substantially uniformly decreasing radius in the direction of rotation of the shear rotor element. The gap plate also provides a feed opening generally tangential to the shearing chamber and opening onto the chamber at its largest radius. The spiroidal configuration of the chamber maintains the exterior peripheral portions of the shear rotor element free of partially plasticized material, so as to facilitate material pick-up at the feed opening. Additionally, the spiroidal configuration of the chamber aids in directing plasticized and partially plasticized material toward the centrally located orifice in the shear stator.

Thus, it is an important object of the present invention to provide an improved elastic melt extruder utilizing a gap element interposed between shear rotor and shear stator elements to define a shearing gap of a configuration promoting the entry and exit of material and promoting the flow of material through the extruder mechanism.

Another important object of the present invention is the provision of an improved elastic melt extruder wherein a shear plate is interposed between shear rotor and shear stator elements to define a shearing chamber communicating only with the confronting faces of the rotor and stator elements and of a spiroidal configuration for accommodating ingress and egress of material.

It is a further, and no less important, object of the present invention to provide a new and improved method for the plasticizing of plastic material in an elastic melt extruder having a shearing gap defined between shear rotor and shear stator elements, the gap being of spiroidal configuration to maintain the periphery of the shear rotor free of material and to direct at least partially plasticized material toward the extrusion orifice.

Other objects of this invention will appear in the following description and appended claims, reference being had to the accompanying drawings forming a part of this specification wherein like reference characters designate corresponding parts in the several views.

On the drawings:

FIGURE 1 is a side elevational view, with parts broken away and in section, illustrating an apparatus of the present invention capable of carrying out the method of the present invention;

FIGURE 2 is a sectional view taken along the plane 2—2 of FIGURE 1; and

FIGURE 3 is a fragmentary sectional view taken along the plane 3—3 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to an elastic melt extruder of the present invention including a supporting frame 11 secured to a bearing ring 12 having an internal chamfered bearing surface 13.

Secured to a front face of the bearing ring 11 is an annular support plate 15 having an inner annular support wall 16 snugly surrounding a rotatable shear plate 20 comprising the shear rotor element of the extruder 10.

This shear rotor element 20 is secured, as by bolts 21, to a driving spider indicated generally at 22, the spider, in turn, being secured by bolts 23 to a flange 24 formed on a drive shaft 25 driven by suitable means, as by an electric or hydraulic motor. Carried by the spider 22 is an annular plain bearing 26 having a chamfered peripheral surface snugly abutting the chamfered surface 13 of the bearing ring 12.

The front or shearing face 28 of the shear rotor 20 contacts a gap plate 30, this gap plate being interposed between the support plate 15 and a front plate or orifice plate 31 constituting the shear stator of the elastic melt extruder. The front plate 31 is centrally apertured, as at 32, for registry with an orifice tube 33 provided at its free end with an orifice tip 34. The orifice tube 33 thus defines an interior passage 35 communicating with the shearing zone of the elastic melt extruder, as will be hereafter described, and the orifice tip 34 has an axial passage 36 through which extrudate is emitted. The front plate 31, the gap plate 30, and the suport plate 15 and the bearing ring 12 are secured together by screws 37, and the spider 22 is guided by a bearing ring 38 secured to the ring 12 by screws 39.

Considering in greater detail the gap plate 30, this plate is well illustrated in FIGURE 2 of the drawings, from which it will be seen that the plate is generally rectangular in configuration and is provided with a central aperture 40 which is spiroidal in configuration, i.e. of substantially constantly decreasing radius about the axis of rotation 41 of the shear rotor 20 as the rotor is rotated in the direction of directional arrow 42. The aperture 40 communicates with a feed opening 43 extending substantially tangentially of the periphery of the plate 20 and also tangentially of the aperture 40 for communication at its open upper end with an overhead supply hopper 44 through which solid plastic material can be supplied to the gap opening 40.

From FIGURES 1 and 3, it will be seen that the shear plate or shear rotor 20 is provided with a planar shearing face 45 which is spaced from the corresponding planar face 31a (FIGURE 1) of the front plate or shear stator 31 through the thickness of the gap plate 30, and that this front face 45 of the plate 20 is coplanar with corresponding face 46 of the support plate 15. Additionally, it will be seen that the rotor element 20 fits snugly within the aperture 16 of the support plate 20, the shear plate periphery being relieved, as at 47, rearwardly of the face 45 to reduce any frictional drag between the plates 15 and 20.

From FIGURE 2, it will be seen that all of the gap opening 40 in the plate 30 lies within the circumference of the shear rotor 20, and that the feed opening 43 has one side wall thereof defined by the front face 46 of the support plate 15 and the aligned shear face 45 of the shear plate 20 and has its other side wall defined by the face 31a of the front plate 31.

The end wall of the feed opening 43 merges smoothly into the largest radiused portion of the aperture 40, as at 48, while the other end wall of the feed opening 43 merges into the smallest radiused portion of the aperture 40, as at 49.

Thus, it will be seen that the greatest degree of overlap between the aperture 40 and the plate surface 45 exists adjacent the feed opening 43, i.e. at the point 49 and that the curved wall defined by the aperture 40 cams or forces partially plasticized material on the surface 45 toward the rotational axis 41 and toward the outlet aperture 32 in the front plate 31. Thus, the plasticized material is directed toward its point of exit from the shearing zone. Additionally, the close running fit between the side walls of the plate 30 and the face 45 of the shear rotor 20 results in the presentation of a material-free portion of the plate face 45 at the feed opening 43 to receive fresh material from the overhead supply hopper 44.

In the operation of the device of the present invention, fresh material is fed from the hopper 44 through the feed opening 43 directly onto the front face 45 only of the shear rotor 20 and at a portion of the shear rotor which is free from pre-plasticized material, since the portion of the shear face 45 picking up the fresh material emerges from the smallest diameter portion of the gap into the feed opening 43. Also, material entering the opening 43 does not first contact the gap plate 30, such contact occurring only after that portion of the rotor 20 enters the gap. As the material contacts the heated surface 45 of the plate 20 (heated for example by conduction from a resistant heater 50 secured to the exterior face of the fixed plate 31), the material adheres to the plate and enters the gap for travel on the plate surface 45 in the direction of the directional arrow 42. This material is then forced radially inwardly toward the axis of rotation of the shear rotor and toward the outlet opening 42 from the shear gap by means of the decreasing radius of the aperture 40.

Having thus described my invention, I claim:

1. In a method of extruding plasticized material from a shear gap defined between relatively rotatable shear rotor and shear stator elements, said gap having a peripheral wall smaller than the facial diameter of said shear rotor and of progressively decreasing radius in the direction of rotation of said rotor, the material exiting from the gap through an extrusion orifice aligned with the axis of rotation of said elements, the steps of feeding material to the gap in a direction tangential to the rotor, initially contacting material with a peripheral portion of said rotor, rotationally moving the material through said gap by rotation of said rotor, and physically contacting the material on the rotor with said gap wall to force the material from the rotor peripheral portion and toward said orifice as it is conveyed through said gap.

2. In a method of extrusion in an elastic melt extruder having relatively rotatable shear rotor and shear stator elements, one of said elements having an outlet orifice, the steps of supplying solid plastic material to a shear gap defined between said elements and circumscribed by a gap plate having an opening therein smaller than the facial diameter of said shear rotor and of progressively decreasing radius in the direction of rotation of said rotor, causing adherence of said material to said rotor, conveying the adhered material rotationally through said gap upon rotation of said rotor element, and contacting said material with said gap plate to force said material radially inwardly of said rotor element (1) to direct material thereon toward said outlet orifice and (2) to clear adhered material from the periphery of the rotor element.

3. In an elastic melt extruder having a rotatable shear rotor element and a fixed shear stator element, the improvements of a gap plate interposed between said rotor and said stator elements and in face-to-face contact therewith, respectively, said gap plate being of a thickness corresponding to the shear gap between said elements and having a central aperture therein defining a shearing zone, said aperture being spiroidal in configuration and of decreasing radius in the direction of rotation of said rotor element, said aperture being smaller than the facial diameter of said shear rotor element and said gap plate having a feed opening substantially tangential to said shear gap at the largest radiused portion of said gap for supplying plastic material therethrough for adherence to a portion of the shear rotor clear of previously introduced material.

4. In an elastic melt extruder having relatively rotatable shear rotor and shear stator elements, the improvements of a gap plate interposed between said elements and in face-to-face contact therewith, respectively, said plate being of a thickness corresponding to the shear gap between said elements and being centrally apertured to define an interior spiroidal shearing zone smaller than the facial diameter of said shear rotor element and of decreasing radius in the direction of rotation of said rotor element, and means for supplying fresh material to said gap at a location tangential to said shear rotor and to a portion of the shear rotor out of contact with said gap plate.

5. In a method of extruding plasticized material from a shear gap defined between relatively rotatable shear rotor and shear stator elements, the material exiting from the gap through an extrusion orifice aligned with the axis of rotation of said elements, the steps of feeding material to a peripheral portion of said rotor, rotationally moving the material through said gap by rotation of said rotor, and forcing the material toward the center of said rotor as it is conveyed through said gap by contacting the material with a wall circumscribing said gap smaller than the facial diameter of said rotor and of decreasing radius in the direction of rotation of said rotor to advance material toward said orifice and to remove material from the periphery of the rotor so that the rotor periphery may pick up additional material.

6. In an elastic melt extruder, a rotatable shear plate having a circular shear face, a support plate closely encompassing the shear plate and having a face flush with the shear face of said shear plate, a gap plate having one face in face-to-face contact with the flush faces of said shear plate and said support plates, a fixed front plate having a substantially planar shearing face in face-to-face contact with the other face of said gap plate and a centrally located outlet orifice, the gap plate thus defining the shearing gap between the shear plate and the front plate, said gap plate having an aperture therein circumscribing said shearing gap and smaller in diameter than said rotatable shear plate, said aperture communicating with a source of plastic material through a feed opening formed in said gap plate and lying substantially tangentially to the shear plate, the gap plate aperture being of substantially uniformly decreasing radius in the direction of rotation of said shear plate to force partially plasticized material on said shear face of said shear plate radially inwardly toward the center thereof for passage from the shear gap through the outlet orifice.

7. In a method of extrusion in an elastic melt extruder having a rotatable shear rotor element and a relatively fixed shear stator element, the steps of supplying solid plastic material to a shear gap defined between said elements and having a peripheral wall smaller in diameter than said shear rotor element and of progressively decreasing radius in the direction of rotation of said rotor, conveying material through said gap by rotation of said rotor element, and contacting said material with said gap wall (1) to progressively force said material toward the axis of rotation of said rotor during its passage through said gap and (2) to free the periphery of said rotor to pick-up subsequently supplied material.

8. In an elastic melt extruder, a rotatable shear plate having a circular shear face, a fixed support plate closely encompassing the shear plate, a fixed orifice plate having a central orifice in a substantially planar shearing face spaced from the circular shear face of the shear plate, a gap plate interposed between said shear plate and said orifice plate and having an aperture therein circumscribing a shearing gap communicating with a source of plastic material through a feed opening lying tangentially to the shear plate, the shearing gap being of spiroidal and of decreasing radius in the direction of rotation of said shear plate and being smaller in diameter than a comparable dimension of said rotatable shear plate, so that the gap walls force partially plasticized material on said shear face of said shear plate radially inwardly toward the center thereof away from the feed opening and toward the outlet orifice.

References Cited by the Examiner
UNITED STATES PATENTS

| 2,645,813 | 7/1953 | Swallow | 264—176 |
| 3,046,603 | 7/1962 | Maxwell | 264—311 |
| 3,079,635 | 3/1963 | Adams | 18—12 |
| 3,137,034 | 6/1964 | Adams | 18—12 |

ROBERT F. WHITE, *Primary Examiner.*

S. A. HELLER, *Assistant Examiner.*